United States Patent [19]

Minamikawa

[11] Patent Number: 5,479,229
[45] Date of Patent: Dec. 26, 1995

[54] DUAL-MODE CAMERA FOR THREE-DIMENSIONAL AND TWO-DIMENSIONAL PHOTOGRAPHY

[75] Inventor: Yukio Minamikawa, Osaka, Japan

[73] Assignee: Photo Craft Co., Ltd., Osaka, Japan

[21] Appl. No.: 309,600

[22] Filed: Sep. 21, 1994

[30] Foreign Application Priority Data

May 20, 1994 [JP] Japan .................................. 6-106497

[51] Int. Cl.⁶ .................................................. G03B 35/10
[52] U.S. Cl. ........................... 354/111; 354/114; 354/159
[58] Field of Search .................................. 354/111, 114, 354/116, 159

[56] References Cited

U.S. PATENT DOCUMENTS

| | | | |
|---|---|---|---|
| 3,953,869 | 4/1976 | Lo et al. | 354/115 |
| 3,960,563 | 6/1976 | Lo et al. | 354/114 X |
| 4,037,950 | 7/1977 | Lo et al. | 352/58 |
| 5,294,951 | 3/1994 | Lo | 354/111 |

*Primary Examiner*—Michael L. Gellner
*Assistant Examiner*—J. K. Han

*Attorney, Agent, or Firm*—Birch, Stewart, Kolasch & Birch

[57] ABSTRACT

A camera for stereoscopic photography functionable both in a stereoscopic mode and in a normal mode comprises a camera body, a plurality of lenses provided on the front face of the camera body and arranged horizontally in a line, a plurality of film chambers provided inside of the camera body and each corresponding to each of the plurality of lenses, a plurality of partition members each provided between two adjacent ones of the plurality of film chambers and defining the width in the horizontal direction of each of the plurality of film surfaces, and a changeover mechanism for changing over from a stereoscopic mode to a normal mode and vice versa. One the plurality of lenses is used for both the stereoscopic mode and the normal mode. Two of the partition members provided on both sides of the film chamber provided corresponding to this lens for both-mode purpose are movable in order to change the transverse width of a film surface used for both-mode purpose. The transverse widths of the plurality of the film chambers become equal to each other in the stereoscopic mode. In the normal mode, the two partition members move such that the film surface for both-mode purpose becomes wider and, upon pressing of a shutter button, only an image-forming light from the lens for both-mode purpose is incident.

6 Claims, 8 Drawing Sheets

Fig. 5(A)
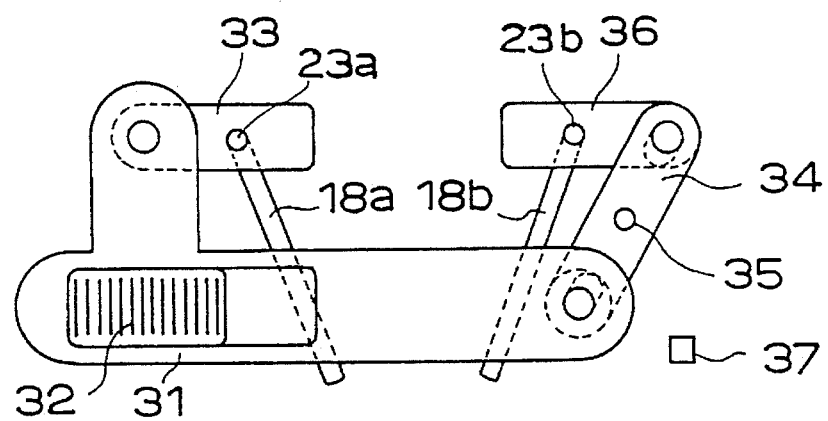
normal mode
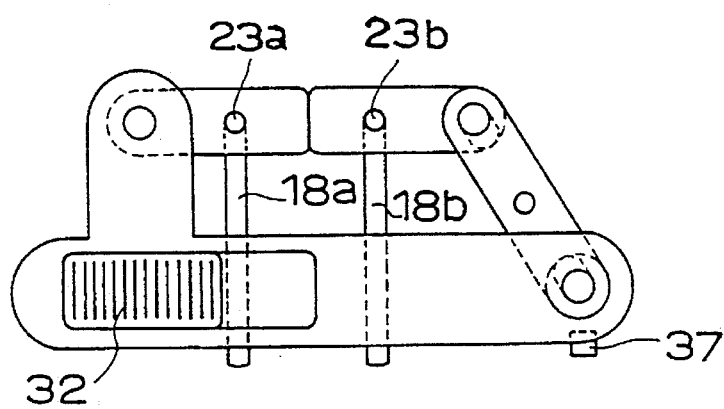
stereoscopic mode
Fig. 5(B)

DUAL-MODE CAMERA FOR THREE-DIMENSIONAL AND TWO-DIMENSIONAL PHOTOGRAPHY

BACKGROUND OF THE INVENTION

1. Field of the Invention

The present invention relates to a camera for stereoscopic photography having a plurality of lenses arranged in a line in the transverse direction (horizontal direction) and, more specifically, one changeable from a stereoscopic mode to a normal mode and vice versa.

2. Description of the Prior Art

Stereoscopic photography utilizing a lenticular screen is known. To prepare this type of stereoscopic photograph, it is necessary to obtain a plurality of images with different parallaxes to an object. For this purpose, stereoscopic cameras having a plurality of lenses are used.

Conventional stereoscopic cameras comprise a plurality of lenses, for example 3 to 5 lenses, which are arranged on the camera body such that their optical axes run parallel with each other and in the same plane with a constant pitch and that, upon photographing, image-forming lights passing therethrough will be incident on the film surfaces positioned perpendicularly to the optical axes.

Photographing with this type of stereoscopic camera records a plurality of images on the film surfaces at positions corresponding to the lenses, with the images being transversely shifted from each other due to the difference in the transverse (horizontal) positions of the lenses. "Transversely" herein means in a direction parallel to the straight line along which the lenses are arranged.

However, conventional stereoscopic cameras are capable of taking only stereoscopic photographs, and cannot take normal photographs which are not stereoscopic, thereby creating several disadvantages. For example, when one wants to take normal photographs as well as stereographic photographs, he should carry a normal camera in addition to a stereoscopic camera. Furthermore, once he has mounted film in his stereoscopic camera, he should continue taking stereoscopic photographs until the film ends.

SUMMARY OF THE INVENTION

Accordingly, an object of the present invention is to provide a camera for stereoscopic photography that can take both stereoscopic photographs and normal photographs.

Thus, the present invention provides a camera for stereoscopic photography functionable both in a stereoscopic mode and in a normal mode, said camera comprising:

a camera body, a plurality of lenses provided on the front face of said camera body and arranged horizontally in a line, a plurality of film chambers provided inside said camera body and each corresponding to each of said plurality of lenses, a film feeding device that, upon photographing, feeds a film strip such that a plurality of film surfaces are formed and each positioned in each of said plurality of film chambers and exposable to each of image-forming lights from said plurality of lenses, a plurality of partition members each provided between two adjacent ones of said plurality of film chambers and defining the width in the horizontal direction of each of said plurality of film surfaces, at least one shutter functionable upon pressing of a shutter button, and changeover means for changing over from a stereoscopic mode to a normal mode and vice versa;

said stereoscopic mode being capable of recording a plurality of images on said film surfaces by said image-forming lights and said normal mode being capable of recording an image on one of said film surfaces, which film surface is used for both-mode purpose, by an image-forming light from one of said plurality of lenses, which lens is used for both-mode purpose;

two of said plurality of partition members being used for both-mode purpose and provided movably by said changeover means on both sides of one of said plurality of film chambers, which corresponds to said lens for both-mode purpose, said two partition members for both-mode purpose functioning such that:

in said stereoscopic mode they are so moved and positioned by said changeover means that all of the widths in the horizontal direction of said plurality of film surfaces become equal to each other, and that in said normal mode they are so moved and positioned by said changeover means that the width in the horizontal direction of said film surface for both-mode purpose becomes wider than that in the stereoscopic mode.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIG. 5(A) and FIG. 5(B) are drawings showing how, with a stereoscopic camera according to the present invention, the partition members are changed over;

DETAILED DESCRIPTION OF THE PREFERRED EMBODIMENT

Figure 1:
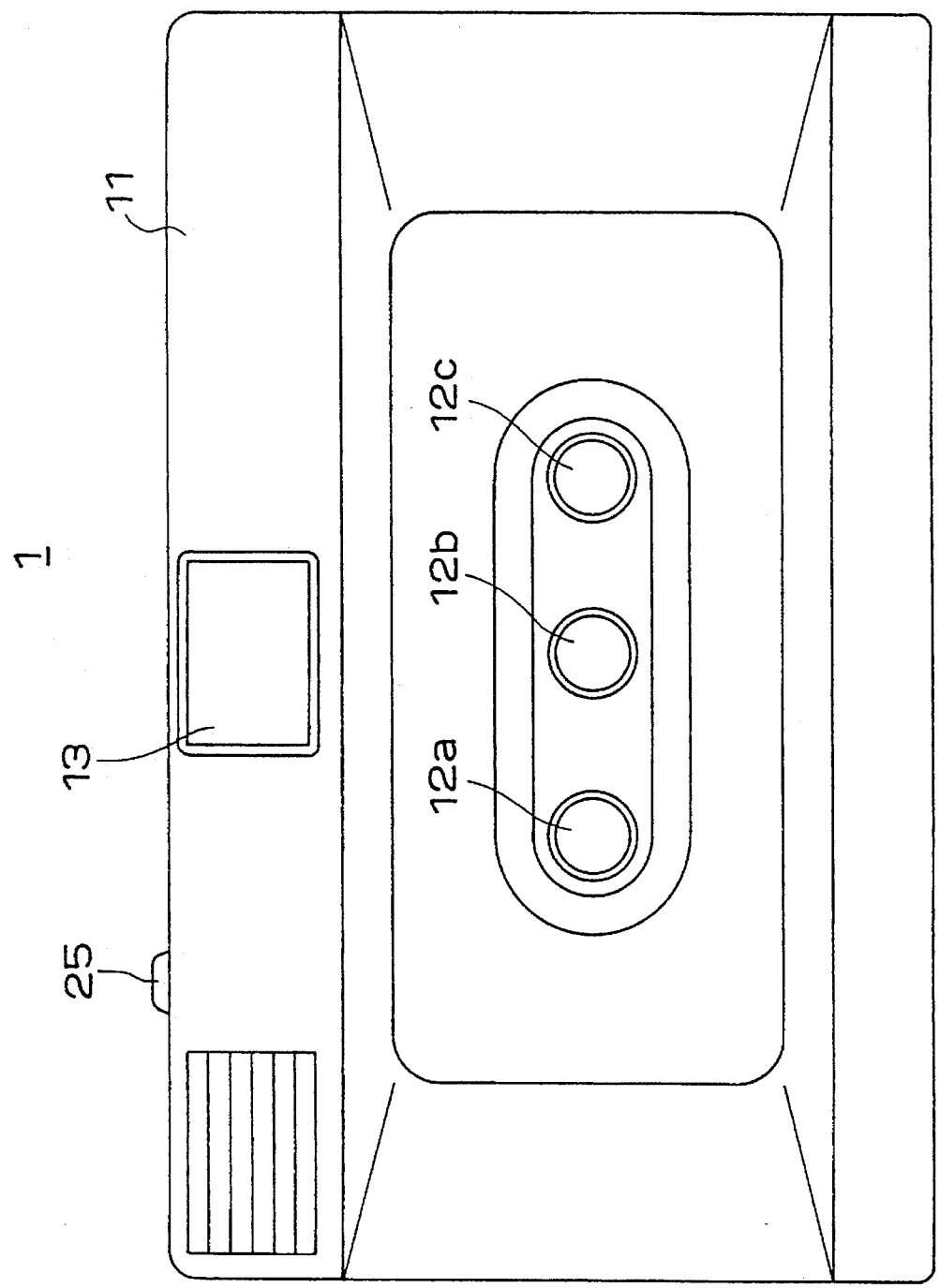
FIG. 1 is a schematic front view showing an outline of a camera for stereoscopic photography according to the present invention.
Figure 2:
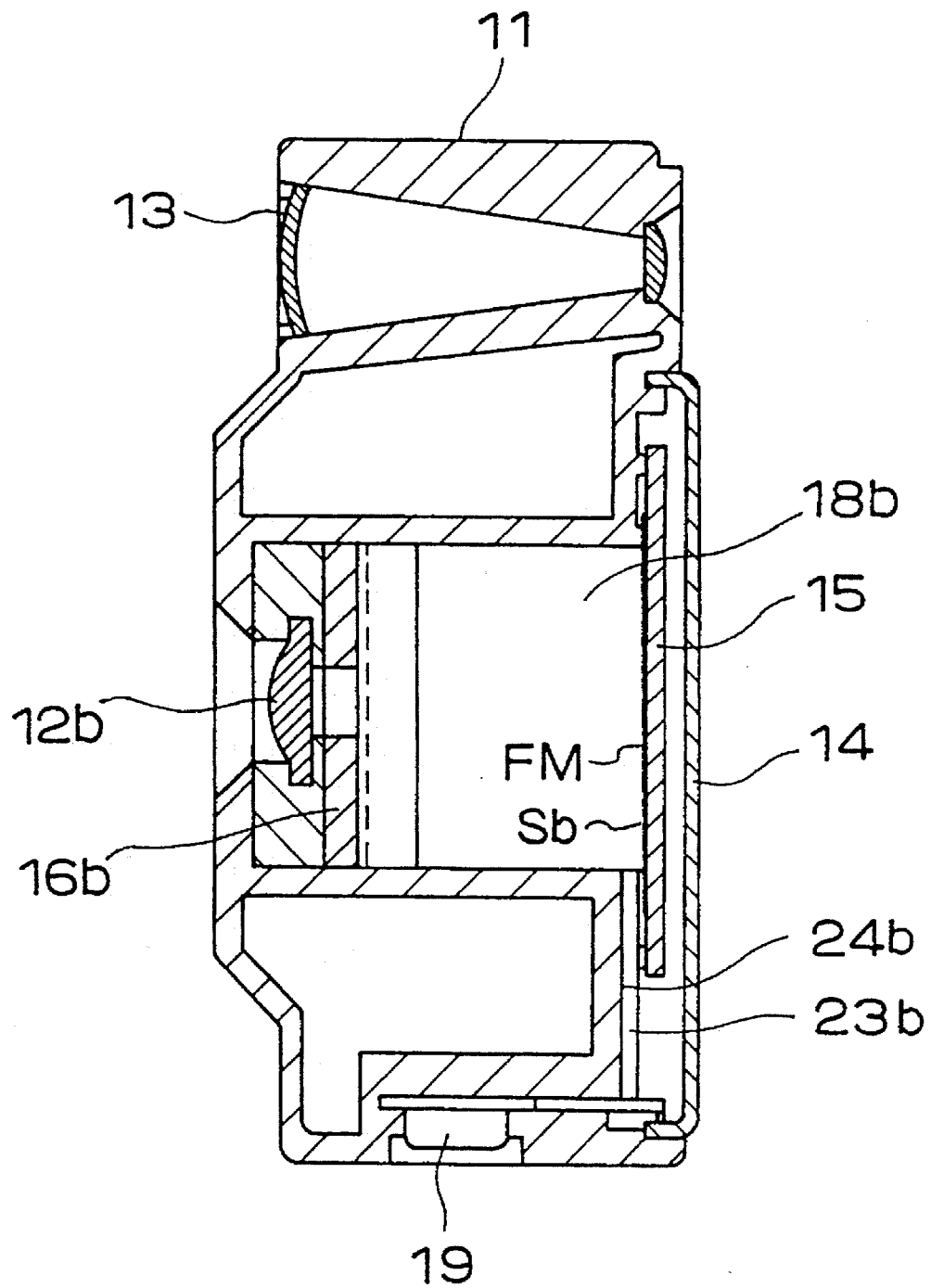
FIG. 2 is a cross-sectional view of the stereoscopic camera shown in FIG. 1 as viewed from the right side.
Figure 3:
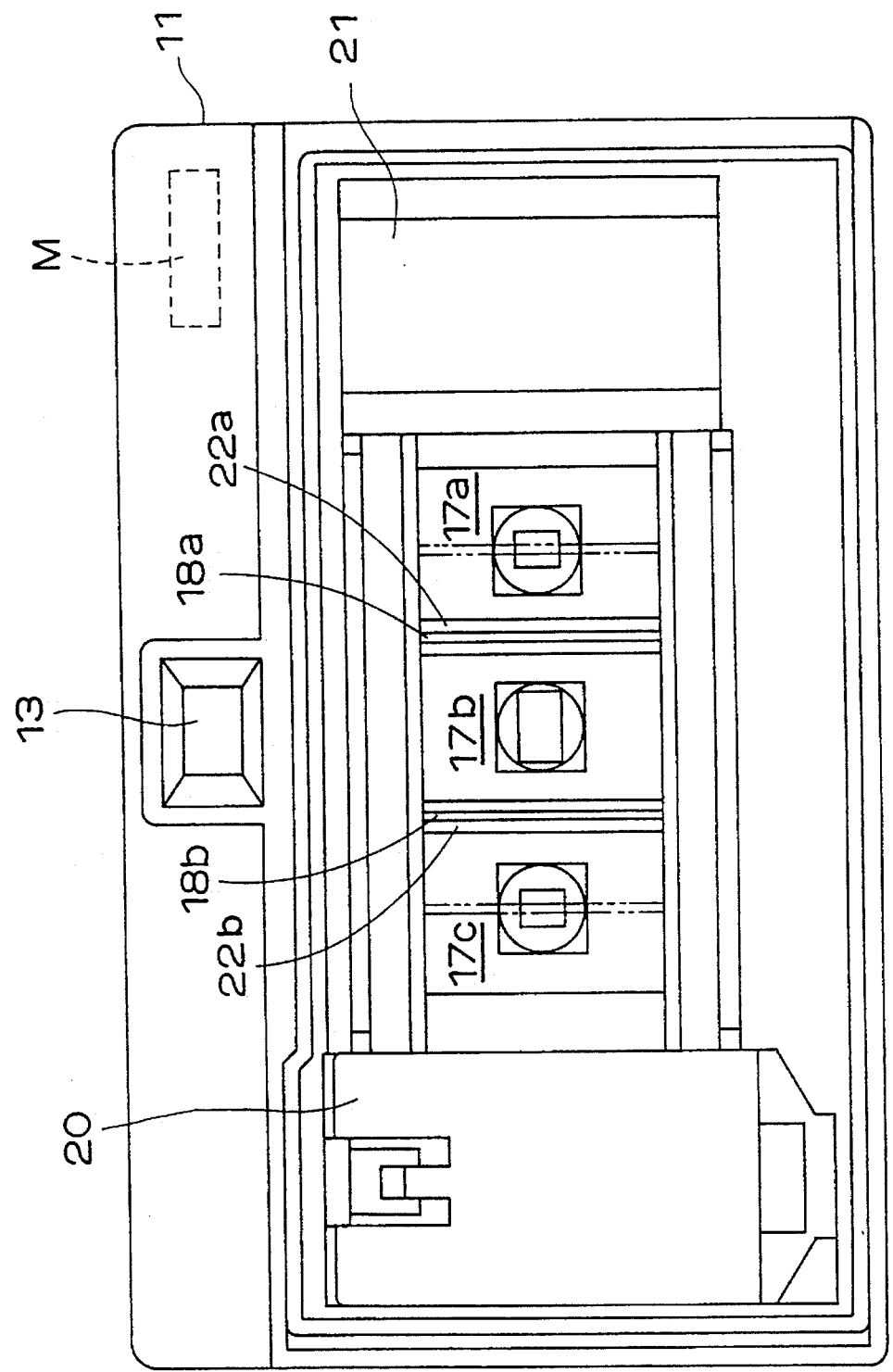
FIG. 3 is a cross-sectional view of the stereoscopic camera shown in FIG. 1 as viewed from the rear side.
Figure 4:
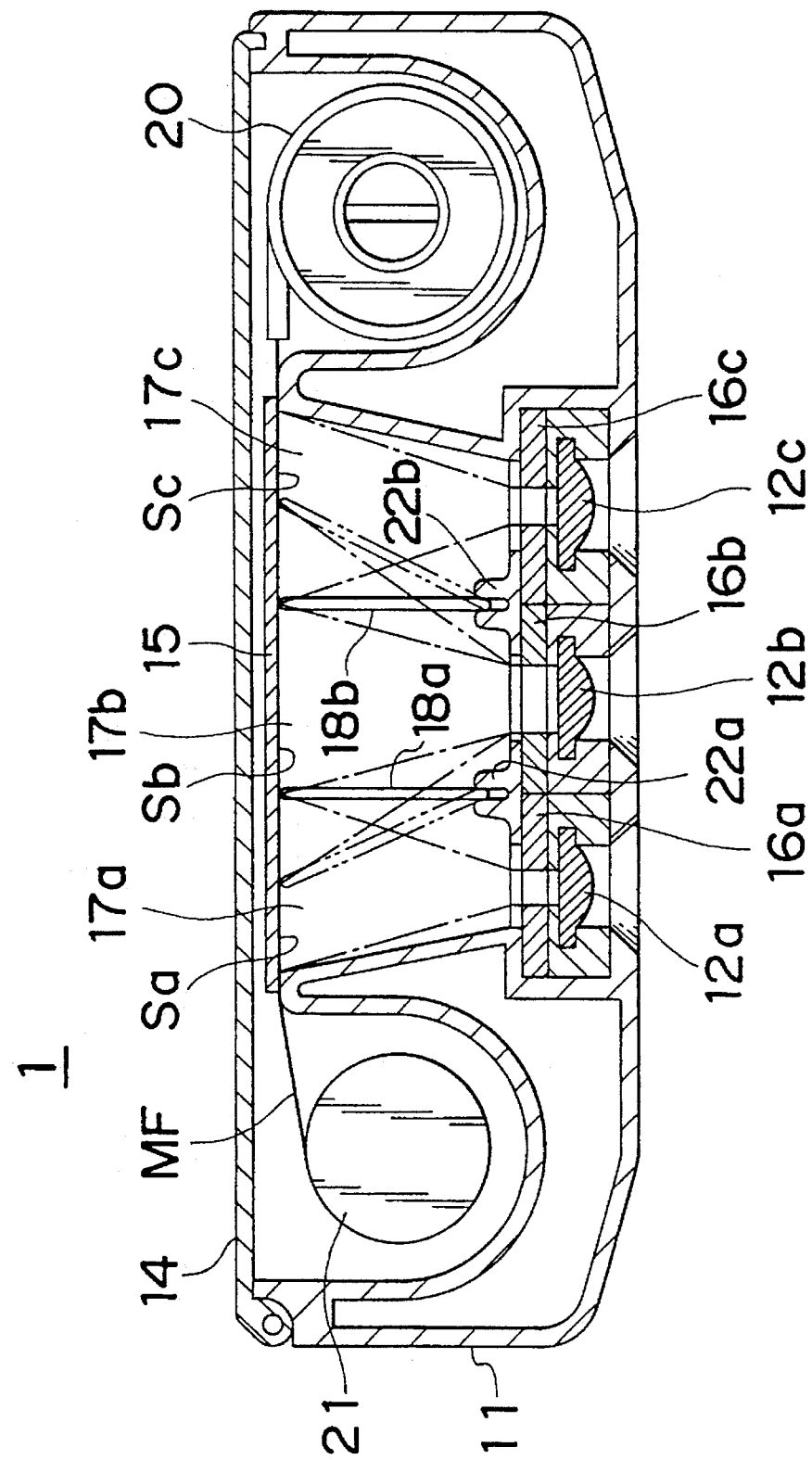
FIG. 4 is a cross-sectional view of the stereoscopic camera shown in FIG. 1 as viewed from above.

Referring now to FIGS. 1 through 4, a camera 1 for stereoscopic photography comprises a camera body 11, three lenses 12a, 12b and 12c, a viewfinder 13, a rear cover 14, a platen 15, three electromagnetic shutter units 16a, 16b and 16c, three film chambers 17a, 17b and 17c, two partition members 18a and 18b, a lever 19 and a shutter button 25. The lever 19 is manually operated to change over the photographing mode from a stereoscopic to a normal mode or vice versa.

The camera body 11, part of which is not shown in the figures, mechanically supports the other structure units and can keep a roll type film FM optically shielded from exterior lights. The camera body 11 is formed by combining a plurality of molded articles from synthetic resins and provided on appropriate spots of its inner and outer surfaces with roughened surfaces to prevent light reflection, which are colored black.

The lenses 12a, 12b and 12c are provided on the front face of the body 11 and arranged horizontally in a line with a pitch of 18.4 mm. In the stereoscopic mode, these three lenses are used at the same time, while in the normal mode only a central one 12b is used. Thus, the central lens 12b constitutes a lens for both-mode purpose usable both in the stereoscopic and normal modes. The film chamber 17b provided corresponding to the lens for both-mode purpose and a film surface Sb, which is to be introduced thereinto upon photographing, also constitutes a film chamber for both-mode purpose and a film surface for both-mode purpose, respectively. Accordingly, the stereoscopic mode is to record three images on three film surfaces Sa, Sb and Sc, while the normal mode is to record on the central film surface Sb a single image by an image-forming light coming from the central lens 12b among the three lenses 12a, 12b and 12c.

Figure 6:
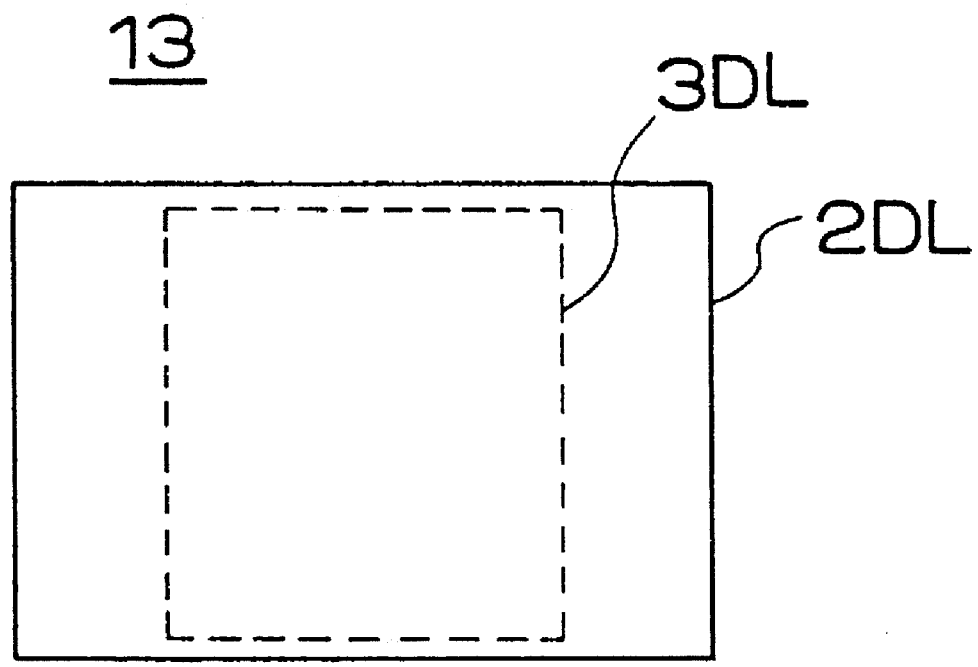
FIG. 6 is a drawing showing the frame for field of view of the finder used in a camera according to the present invention.

The view finder 13 presents, as shown in FIG. 6, an entire frame 2DL (two dimensional) for normal mode and a smaller frame (dotted line) 3DL (Three Dimensional) for stereoscopic mode.

The rear cover 14 is openable so that a film cartridge 20 can be mounted or taken out. With the rear cover 14 being shut, the platen 15 attached to the rear cover 14 contacts the film FM, whereby the three film surfaces Sa, Sb and Sc formed by a continuous part of the film FM are positioned in the film chambers 17a, 17b and 17c, respectively.

The electromagnetic shutter units 16a, 16b and 16c are provided such that they can act independently on the lenses 12a, 12b and 12c, respectively. In the stereoscopic mode, pressing the shutter button 25 makes the three electromagnetic shutter units 16a, 16b and 16c open simultaneously. In the normal mode, pressing the shutter button 25 makes only the central electromagnetic shutter unit 16b open and keeps the electromagnetic shutter units 16a and 16c on both sides closed. These electromagnetic shutter units 16a, 16b and 16c are controlled by a control section 29 which is to be described later herein.

The film chambers 17a, 17b and 17c will house the film surfaces Sa, Sb and Sc, respectively. Upon stereoscopic photographing, the film surfaces Sa, Sb and Sc are exposed to image-forming lights from the lenses 12a, 12b and 12c, respectively, whereby images are obtained on the film surfaces Sa, Sb and Sc. The three film chambers 17a, 17b and 17c are partitioned by two movable partition members 18a and 18b provided at the boundaries between two adjacent chambers 17a and 17b, and 17b and 17c, respectively.

Figure 7:
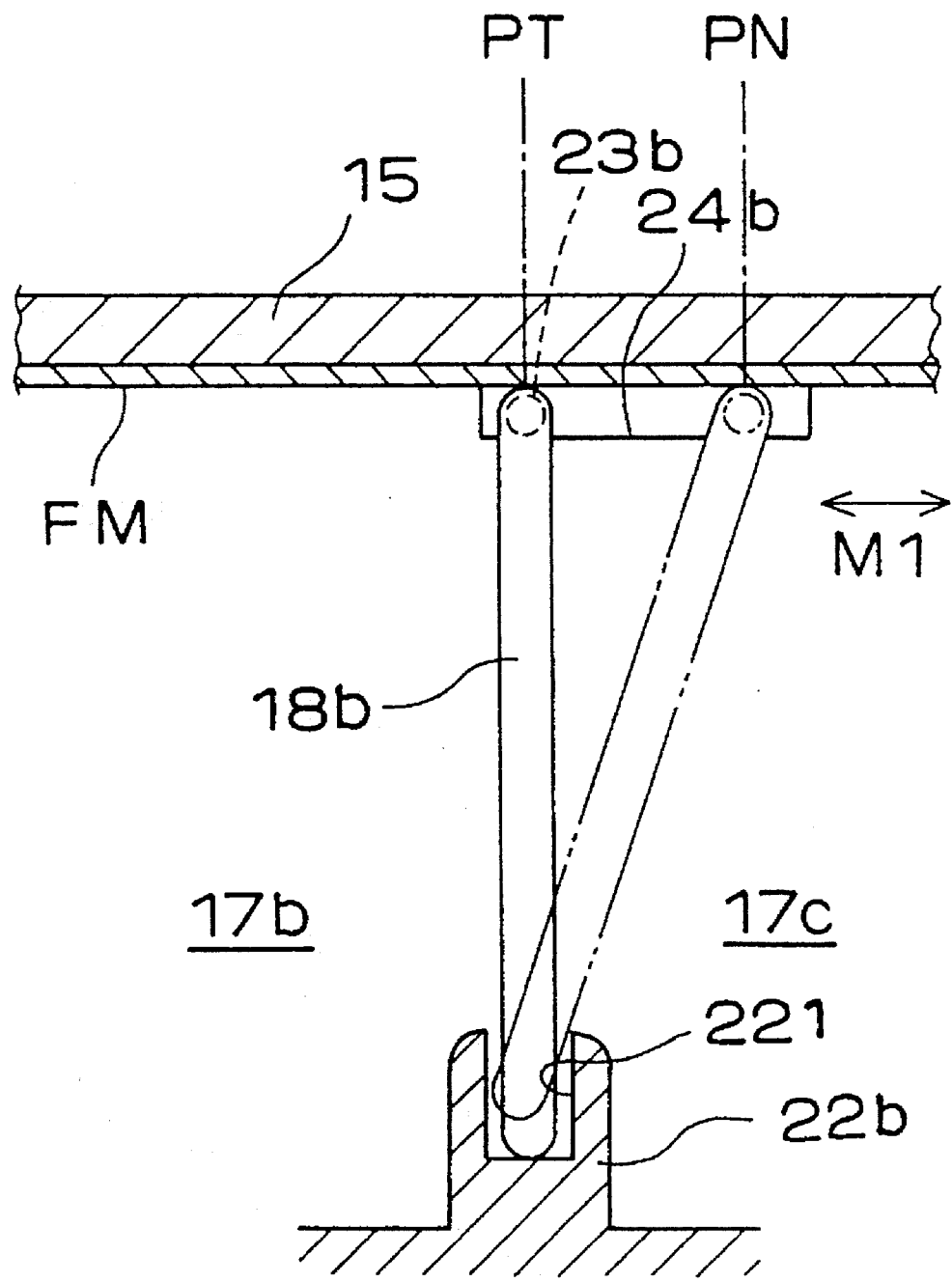
FIG. 7 is an enlarged view from above showing how one of the partition members changes its position.

As shown in FIG. 7, the end of each of the partition members 18a and 18b is slidably inserted into a slit 221 provided on each of supporting parts 22a and 22b. Thus, the partition members 18a and 18b are horizontally turnable about the supporting parts 22a and 22b and transversally movable. A connecting shaft 23b provided on the film-side end of the partition member is movable in the direction M1 along a groove 24b provided on the camera body 11, and can change over the position of the partition end between position PT (stereoscopic position) for stereoscopic mode and position PN (normal mode position) for normal mode.

When the partition members 18a and 18b are positioned at the stereoscopic position PT, all of the film chambers 17a, 17b and 17c have a width in the transversal direction of 17.6 mm, so that three half-size images can be simultaneously obtained on the three film surfaces Sa, Sb and Sc through the three lenses 12a, 12b and 12c. When the partition members 18a and 18b are positioned at the normal position PN, the central film chamber 17b has a transversal width of 36 mm, so that a single full-size image is obtained on the central film surface Sb through the central lens 12b.

Referring to FIG. 5, the lever 19 (i.e. changeover means) comprises a slide base 31 slidable in the transverse direction of the camera body 11, a knob 32 for moving the slide base 31, a first slide plate 33 pivotably connected to the slide base 31, a connection link 34 also pivotably connected to the slide base 31 and supported pivotably with a shaft 35, and a second slide plate 36 pivotably connected to the connection link 34. The bottom end of connecting shafts 23a and 23b of the partition members 18a and 18b are pivotably connected to the slide plates 33 and 36. A mode sensor 37 is provided in order to detect the position of the slide base 31. The signal detected with the mode sensor 37 is inputted into the control section 29 which is to be described later herein.

Upon manual operation of the knob 32, the positions of the partition members 18a and 18b can be changed over between the normal position PN shown in FIG. 5(A) and the stereoscopic position PT shown in FIG. 5(B).

Figure 8:
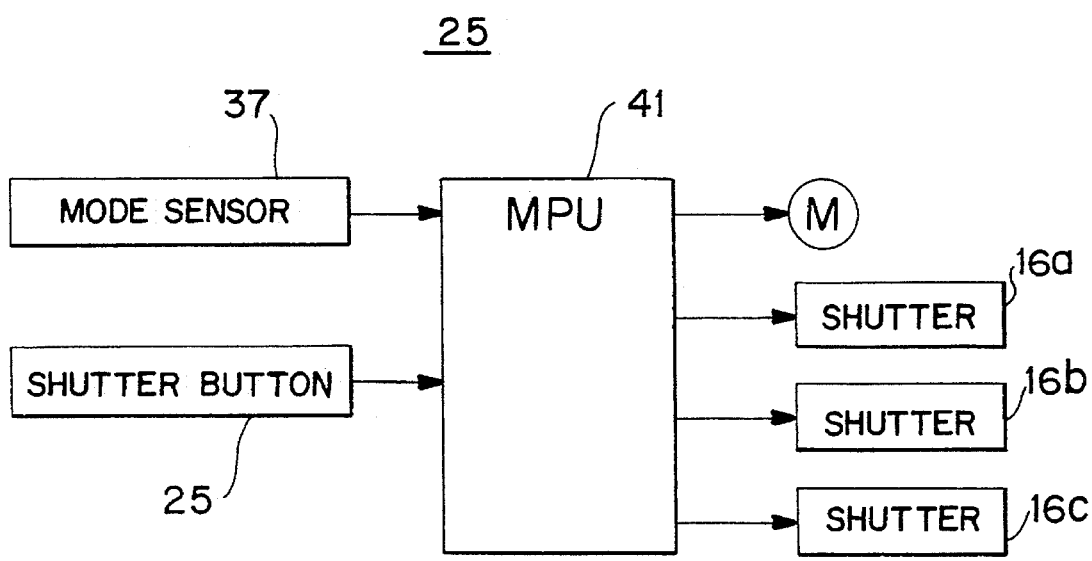
FIG. 8 is the block diagram of a control section applicable to a camera according to the present invention.

Referring to FIG. 8, the control section 29 comprises an MPU (microprocessor unit) 41 provided with an appropriate interface, and housing a ROM containing appropriate programs and a RAM for working storage.

When the mode sensor 37 is detecting the slide base 31, i.e. in the stereoscopic mode, pressing the shutter button 25 permits three electromagnetic shutter units 16a, 16b and 16c to operate simultaneously and open for a designated time. When the mode sensor 37 is not detecting the slide base 31, i.e. in the normal mode, pressing the shutter button 25 permits only the central electromagnetic unit 16b to operate and open for a designated time.

After the electromagnetic shutter units 16a, 16b and 16c have operated, a motor M rotates to rotate a winder 21, so that the film FM withdrawn from a film cartridge 20 is taken up on the winder 21. At this time, the rotation number of the motor M is so controlled as to feed the film FM by a designated length according to the selected mode. That is, in the stereoscopic mode, the film FM is fed by a length equal to the sum of the widths of film surfaces Sa, Sb and Sc, so that unexposed film FM forms new three unexposed film surfaces Sa, Sb and Sc; while in the normal mode the film is fed by a length equal to the width in the transverse direction of the central film surface Sb.

As described above, according to the stereoscopic camera 1 of this embodiment, manual operation of the lever 19 can readily change over between the stereoscopic mode for taking stereoscopic photographs and the normal mode for taking normal photographs.

In the above embodiment, the normal mode permits the film FM to be exposed in full size, while the stereoscopic mode permits it to be exposed in half size. As a result, good quality of the image is obtained in the normal mode, and the film FM is efficiently usable even when used alternately in the normal and stereoscopic modes.

In the above embodiment, other various structures can be used for movably supporting the partition members 18a and 18b and for moving the partition members 18a and 18b. There may be a felt sheet or like light-shielding materials attached on part of the camera body 11 where the partition members 18a and 18b touch upon moving.

In the above embodiment, in order to prevent image-forming lights from the lenses 12a and 12b on both sides from being incident in the normal mode, the corresponding electromagnetic shutter units 16a and 16c are controlled to remain closed. Instead of this mechanism, there may be used a mechanical shutter system such that operation of the lever 19 permits the front face of each of the lenses 12a and 12c on both sides to be covered with a light-shielding plate. In addition, while the above embodiment employs a motor M for taking up or rewinding the film FM, this operation can also be carried out manually without using a motor. In this way, employment of mechanical and/or manual systems for all motions and operations can provide an inexpensive stereoscopic camera, which may be disposed of after use. Contrary to this, the partition members 18a and 18b may be moved by motor M, to obtain a high-grade stereoscopic camera. There may also be provided a mechanism for adjusting the focus, one for adjusting the exposure time, one for adjusting the iris, and other mechanisms.

While the number of the lenses are three in the above embodiment, four or more lenses may be used.

Obviously, numerous modifications and variations of the present invention are possible in light of the above teachings. It is therefore to be understood that within the scope of the appended claims, the invention may be practiced otherwise than as specifically described herein.

What is claimed is:

1. A camera for stereoscopic photography functionable both in a stereoscopic mode and in a normal mode, said camera comprising:

a camera body having a front portion and a rear portion, a plurality of lenses provided on the front face of said camera body and arranged horizontally in a line, a plurality of film chambers provided inside said camera body and each corresponding to each of said plurality of lenses, a film feeding device that, upon photographing, feeds a film strip such that a film surface is positioned in each of said plurality of film chambers and exposable to each of image-forming lights from said plurality of lenses, thus forming a plurality of spaced-apart film surfaces, a plurality of partition members each provided between two adjacent ones of said plurality of film chambers and defining the width in the horizontal direction of each film surface, at least one shutter functionable upon pressing of a shutter button, and changeover means for changing over from a stereoscopic mode to a normal mode and vice versa;

said stereoscopic mode recording a plurality of images on said plurality of film surfaces by said image-forming lights, and said normal mode recording an image on one film surface by an image-forming light from one of said plurality of lenses, said one of said plurality of lenses thus constituting a lens used for both modes; said plurality of partition members being provided movably by said changeover means on both sides of one of said plurality of film chambers, which corresponds to said lens used for both modes, said partition members each having a first end and a second end, each of said first ends of said partition members being slidably inserted in a corresponding slot located in said front portion of said camera body, each of said second ends of said partition members being pivotally attached to said changeover means, said changeover means being operable to move said partition members between a first position for taking stereoscopic pictures wherein said second ends of said partition members are spaced apart a first distance, and a second position for taking normal pictures wherein said second ends of said partition members are spaced apart a second distance greater than said first distance.

2. The camera for stereoscopic photography according to claim 1, wherein when said shutter button is pressed while in said normal mode, only said image-forming light from said lens used for both modes is incident.

3. The camera for stereoscopic photography according to claim 2, wherein said changeover means comprises a manually operatable lever.

4. The camera for stereoscopic photography according to claim 2, wherein said plurality of lenses are three in number, among which a centrally positioned lens constitutes said lens used for both modes.

5. The camera for stereoscopic photography according to claim 2, wherein when in said stereoscopic mode, all of said images are of half size and when in said normal mode, said one image is of full size.

6. A camera for taking both two-dimensional normal pictures and three-dimensional stereoscopic pictures comprising:

a camera body having a front portion and a rear portion;

a plurality of lenses provided in said front portion of said camera body and arranged in a horizontal line;

a film plane provided in said rear portion of said camera body and located behind each of said plurality of lenses;

a plurality of chambers provided inside of said camera body, each corresponding to each of said plurality of lenses;

a plurality of movable partition members each provided between adjacent ones of said plurality of chambers, said movable partition members positioned when taking three-dimensional stereoscopic pictures so as to prevent light entering one lens from exposing film in the film plane behind any of the other lenses, said movable partition members each having a first end and a second end, each of said movable partition members extending substantially between said front portion and said rear portion of said camera body;

a plurality of slots located in said front portion of said camera body, each slot receiving said first end of a corresponding movable partition member slidably inserted therein; and a changeover device for changing an operation mode of said camera between a two-dimensional normal mode and a three-dimensional stereoscopic mode, said changeover device including a partition member moving device operatively connected to each of said second ends of said movable partition members for moving said partition members between a first position for taking three-dimensional stereoscopic pictures wherein said second ends are spaced apart a first distance, and a second position for taking two-dimensional normal pictures wherein said second ends are spaced apart a second distance greater than said first distance.

* * * * *